United States Patent [19]
Routson

[11] 3,757,861
[45] Sept. 11, 1973

[54] OIL RECOVERY EMPLOYING PEROXIDES AND ALKALIS

[75] Inventor: Willis G. Routson, Walnut Creek, Calif.

[73] Assignee: The Dow Chemical Company, Midland, Mich.

[22] Filed: Apr. 1, 1971

[21] Appl. No.: 130,541

[52] U.S. Cl. .............................. 166/273, 166/274
[51] Int. Cl. ............................................ E21b 43/16
[58] Field of Search ................................... 166/273

[56] References Cited
UNITED STATES PATENTS

| | | | |
|---|---|---|---|
| 3,195,629 | 7/1965 | Leach | 166/273 |
| 3,529,666 | 9/1970 | Crowe | 166/300 |
| 3,139,929 | 7/1964 | Habermann | 166/273 |
| 3,080,917 | 3/1963 | Walker | 166/273 |
| 3,387,655 | 5/1968 | Hurd | 166/273 |

Primary Examiner—Marvin A. Champion
Assistant Examiner—Jack E. Ebel
Attorney—Griswold & Burdick and Richard W. Hummer

[57] ABSTRACT

For more efficient recovery of petroleum, particularly for recovery of residual oil after conventional water flooding, an aqueous solution of hydrogen peroxide is injected into the oil-bearing formation and followed by an alkaline solution such as an aqueous solution of sodium hydroxide. The resulting treated slug may then be displaced toward a production well or wells, preferably employing a mobility control agent in the driving fluid, to sweep out residual oil.

11 Claims, No Drawings

OIL RECOVERY EMPLOYING PEROXIDES AND ALKALIS

BACKGROUND OF THE INVENTION

In the practice of the secondary recovery of petroleum from subterranean formations, water flooding is commonly employed. In such operations, water is injected down an input well and into the formation to displace oil from the formation toward a producing well through which the oil is recovered. The use of alkaline additives such as sodium carbonate or sodium hydroxide in the flood water has been proposed in order to improve oil recovery. However, such alkaline floods have proved effective in only limited types of formations bearing special varieties of petroleum.

It has also been suggested, as for example in U.S. Pat. Nos. 3,298,436, 3,330,347 and 3,344,858, to produce surfactant compounds in situ in the oil-bearing formations by injecting an acid compound followed by a caustic solution. Such operations, however, have not found widespread use because of the inherent expense thereof.

SUMMARY OF THE INVENTION

In accordance with the present invention, it has now been discovered that improvements in recovery of fluid hydrocarbons such as petroleum from subterranean petroleum-bearing formations is achieved by introducing into the formation an aqueous solution of peroxide, typically hydrogen peroxide, and thereafter or simultaneously introducing an aqueous solution of a strong alkali. In general, the invention is carried out in accordance with the usual practice of water flooding whereby the treating agents are introduced into an injection well and displaced through the formation toward one or move producing wells from which the petroleum is recovered. However, it is within the ambit of the present invention to introduce the successive treating solutions and displace them into the oil-bearing formations under pressure and thereafter to relieve the pressure and produce oil from the same well through which the injection took place.

The method of the present invention will normally be practiced in oil fields which have been engineered for secondary recovery by conventional water flooding. In fact in one embodiment of the invention the present method is employed after conventional water flooding has been carried to the point where yields are no longer economical although substantial amounts of petroleum are known to remain in the formation. In conventional water flood operations, it is standard practice to drill a number of wells to penetrate the oil-bearing stratum. At least one such well is employed for injecting fluids into the oil-bearing stratum and one or more wells spaced apart from each injection well are employed for producing oil displaced by the injected fluid. Since a plurality of wells is normally involved in any given oil field, it is usually possible from the study of core logs, production logs, and the like, to estimate the average porosity of the oil-bearing stratum and the amount of residual oil in place.

In carrying out the invention, an aqueous solution containing at least 5 percent by weight of an inorganic peroxide such as hydrogen peroxide is pumped into one or more injection wells and out into the oil-bearing formation until an amount of said solution has been injected corresponding to at least about 0.04 pore volume and preferably from about 0.1 to about 0.5 pore volume of the formation to be treated. In some circumstances even larger amounts of peroxide solution may be used. Thereafter an aqueous solution of a strong alkali is injected in an amount at least equal to that of the preceding peroxide solution. Alternatively, auxiliary injection means may be introduced through the wellbore whereby the peroxide solution and alkali solution are injected simultaneously into the formation. Further aqueous fluid, which may be more of the strong alkali solution or any of the aqueous fluids such as oil field brine which are commonly employed in water flooding, is then injected to displace the treated oil toward the production well or wells. Alternatively, after introduction of the peroxide and alkali, sufficient pressure may be applied to the injection well to push the respective solutions into the formation and maintain same therein for a period sufficient for reaction to occur and thereafter the pressure is relieved and oil is produced through the injection well.

In a preferred embodiment of the invention, the injected slug of peroxide and alkali is followed by a slug of a suitable mobility control agent preceding the final brine flood. Preferred mobility control agents are solutions in water or brine of high-molecular-weight, water-soluble polymers having resistance properties as defined in U.S. Pat. No. 3,282,337. Alternatively, the mobility control agent may be a solution of a biopolymer such as the heteropolysaccharides produced by bacteria of the genus Xanthomonas as described in U.S. Pat. No. 3,305,016. The polymer solution coacts beneficially with the peroxide-alkali treatment to maintain the products of reaction of the peroxide with petroleum in a bank or slug which is then displaced through the formation to one or more producer wells. In this manner optimal efficiency in recovery of residual oil is realized.

In preparing the solution of peroxide for use in the present method, it is desirable to test the source of water to be employed to assure that the water does not contain impurities which might decompose the peroxide before it reaches the oil in place in the formation. In general, the water employed for preparing the peroxide solution should be relatively free of readily oxidized ingredients such as emulsified petroleum and other organic matter or sulfide or sulfite ions or ferrous ions or the like. In some cases it may be desirable to incorporate a neutral buffer or other preservative in the solution to assure that the peroxide reaches the oil-bearing formation without decomposing. The exact amount of hydrogen peroxide to be employed in the solution will vary depending upon the nature of the formation to be treated and of the petroleum contained therein. Good results are obtained when employing from about 7 to 15 percent or more by weight of hydrogen peroxide in the treating solution. In some cases higher concentrations of up to about 30 percent by weight of hydrogen peroxide may be employed. However, before employing concentrations of 15 percent or more, preliminary small scale tests should be run with the oil from the reservoir in question to assure that uncontrollable or explosive reactions do not occur.

In preparing the alkaline solution to be injected following the peroxide solution, any suitable alkaline agent may be employed. For such purposes, any of the alkali metal hydroxides or carbonates or ammonium hydroxide may be used. However, for reasons of economy and ready availability, it is generally preferred to employ sodium hydroxide. The exact concentration of alkali may vary depending upon such factors as the porosity of the formation and the type of petroleum in place therein. In general, the alkaline solution should contain at least about 0.05 percent by weight and preferably 0.5 percent or more of the alkaline agent. Thus, with sodium hydroxide from about 0.05 to about 10 percent by weight may suitably be employed in the alkaline solution. Preferably, a solution containing from about 2 to 5 percent by weight of alkali is forced into the formation accompanying or following the injection of the peroxide solution.

In practice it is sometimes desirable to follow the injection of the peroxide solution with a pressurizing step employing an inert fluid such as gas or a slug of oil field brine, to drive the peroxide solution out of the well bore into the oil-bearing formation before introducing the following slug of alkaline solution. When employing brine for pressurizing, it is generally desirable to employ an amount of brine at least equal to the volume of the well bore to assure that all of the peroxide is forced into the oil-bearing formation before being contacted with alkali. The duration of the pressurizing step will be governed by predetermined factors such as the injectivity and permeability of the formation and the bottom hole and well head pressures.

The following examples illustrate the invention but are not to be construed as limiting the same.

EXAMPLE 1

Cylindrical core samples about one inch in diameter by one inch in length, cut from Berea sandstone and of known porosity, were mounted in core holders equipped with pressure fittings on the opposite faces of the cores so that fluids could be forced lengthwise therethrough. The cores were initially saturated with a simulated oil field brine consisting of an aqueous 3 percent solution of sodium chloride and then with a sample of crude California petroleum (A.P.I. gravity = 30.7). Each core was then flooded with the brine to displace as much as possible of the petroleum therefrom as in a water flood operation and the produced petroleum was collected and measured. Various treatments were then applied to individual cores in an attempt to recover residual oil therefrom.

In one such treatment, one-half pore volume of an aqueous 7 percent by weight solution of hydrogen peroxide was injected into the core followed by one-half pore volume of aqueous 4 percent by weight sodium hydroxide solution, and the core was then flooded with the 3 percent brine until no further petroleum was displaced. The petroleum produced by this treatment was collected and measured. The core was then extracted with a volatile organic solvent for the petroleum to determine the residual oil in the core. From these measurements it was determined that 58.9 percent of the total oil in the core was recovered in the initial brine flood and an additional 9.6 percent of the total oil was obtained by the peroxide and caustic treatment. Thus, the peroxide and caustic alkali treatment resulted in a 16.3 percent improvement in recovery of petroleum oil from the core.

EXAMPLE 2

For comparison purposes two further cores were treated by the exact procedure of Example 1 except that, following the initial brine flood, one of the cores was treated solely with one-half pore volume of the aqueous 4 percent sodium hydroxide solution followed by the final brine flood and the other of the cores with ½ pore volume of aqueous 3 percent solution of hydrogen peroxide followed by ½ pore volume of the 4 percent sodium hydroxide solution and the final brine flood. Neither of these treatments resulted in any measurable improvement in recovery of petroleum from the cores.

EXAMPLE 3

The procedure of Example 1 was repeated except that an aqueous 10 percent solution of hydrogen peroxide was employed in place of the 7 percent peroxide solution of Example 1. The subsequent treatment with sodium hydroxide solution and brine was as before. This treatment resulted in a 22.5 percent improvement in recovery of petroleum oil from the core as compared to the recovery with brine flooding alone.

EXAMPLE 4

Further determinations were carried out using the general procedure of Example 1 for preparation and brine flooding of the cores except that cores of Berea sandstone 10 inches long were employed. In two determinations in which one pore volume of aqueous 10 percent by weight solution of hydrogen peroxide was injected into such a 10-inch core followed by ½ pore volume of aqueous 4 percent sodium hydroxide solution and then by brine, improvements of 39 percent and 41 percent, respectively, were obtained in overall oil recovery.

EXAMPLE 5

The procedure of Example 4 is repeated except that the sodium hydroxide solution is followed by ½ pore volume of polymer solution prior to the final flooding with brine. The polymer solution consists of a solution in 3 percent sodium chloride brine of a high-molecular-weight polyacrylamide having about 23 percent of its carboxamide groups hydrolyzed to sodium carboxylate groups and contains 1,000 parts by weight of the polymer per million parts of the brine. A further improvement in recovery of residual oil is observed.

Similar improvements can be obtained by following the peroxide and alkali with a slug amounting to 0.05 to 0.5 pore volume of a solution containing from about 100 to about 2,000 parts by weight (per million parts of flooding medium) of a water-soluble polymer such as a long-chain polysaccharide, a polyacrylamide or hydrolyzed polyacrylamide or a sodium styrenesulfonate polymer.

I claim:

1. A method for recovering fluid hydrocarbons from a subterranean oil-bearing formation which is penetrated by a well bore which comprises the steps of injecting into said formation through said well bore an aqueous solution containing at least about five percent by weight of an inorganic peroxide in the amount of at least about 0.04 pore volume of the formation and thereafter injecting into the formation an aqueous solution containing at least about 0.5 percent by weight of an alkaline agent in an amount at least equal to that of the peroxide solution, and producing oil from said formation.

2. A method according to claim 1 wherein the injected solutions are displaced through the formation from the injection well toward at least one producing well penetrating the same formation.

3. A method according to claim 1 wherein the peroxide is hydrogen peroxide.

4. A method according to claim 1 wherein the alkaline agent is ammonium hydroxide or an alkali metal hydroxide or carbonate.

5. A method according to claim 4 wherein the alkaline agent is sodium hydroxide.

6. A method according to claim 2 wherein the injected solutions consist, respectively, of an aqueous solution of from about 7 to about 15 percent by weight of hydrogen peroxide and an aqueous solution of from about 2 to about 5 percent by weight of sodium hydroxide.

7. A method according to claim 2 wherein the peroxide and alkaline solutions are displaced by injection of a solution of high-molecular-weight, water-soluble polymer.

8. A method according to claim 6 wherein the hydrogen peroxide solution is employed in the amount of from about 0.1 to about 0.5 pore volume of the treated formation.

9. A method according to claim 8 wherein the peroxide and sodium hydroxide solutions are followed by from about 0.05 to about 0.5 pore volume of an aqueous solution containing a high-molecular-weight, water-soluble polymer.

10. A method according to claim 9 wherein the polymer solution contains from about 100 to about 2,000 parts by weight of a partially hydrolyzed polyacrylamide per million parts of injected fluid.

11. A method according to claim 6 wherein the hydrogen peroxide solution is driven into the formation under pressure of an inert fluid prior to the injection of the sodium hydroxide solution.

* * * * *